United States Patent [19]

Turner et al.

[11] Patent Number: 4,520,182

[45] Date of Patent: May 28, 1985

[54] ACRYLAMIDE-ALKYLACRYLAMIDE COPOLYMERS

[75] Inventors: S. Richard Turner, Rochester, N.Y.; Donald B. Siano, Fanwood; Jan Bock, Bridgewater, both of N.J.

[73] Assignee: Exxon Research & Engineering Co., Florham Park, N.J.

[21] Appl. No.: 526,991

[22] Filed: Aug. 29, 1983

Related U.S. Application Data

[63] Continuation-in-part of Ser. No. 454,239, Dec. 29, 1982, abandoned, and a continuation-in-part of Ser. No. 454,290, Dec. 29, 1982, abandoned.

[51] Int. Cl.$^3$ ............................................. C08F 20/56
[52] U.S. Cl. ................................................. 526/307.2
[58] Field of Search ...................... 526/303, 307.2, 307

[56] References Cited

U.S. PATENT DOCUMENTS

| | | | |
|---|---|---|---|
| 2,790,789 | 4/1957 | Miller | 526/303.1 |
| 3,075,956 | 1/1963 | Shields et al. | 526/303.1 |
| 4,098,987 | 7/1978 | Barua et al. | 526/304 |
| 4,151,333 | 4/1979 | Lenke et al. | 526/307.2 |
| 4,154,910 | 5/1979 | Tanaka et al. | 526/307.2 |

FOREIGN PATENT DOCUMENTS

| | | | |
|---|---|---|---|
| 1110422 | 7/1961 | Fed. Rep. of Germany | 526/307.2 |
| 1169064 | 4/1964 | Fed. Rep. of Germany | 526/307.2 |

Primary Examiner—Joseph L. Schofer
Assistant Examiner—Peter F. Kulkosky
Attorney, Agent, or Firm—Richard E. Nanfeldt

[57] ABSTRACT

Water soluble acrylamide/alkylacrylamide copolymers which are efficient viscosifiers of water or brine are described. They are made by processes which finely disperse the water insoluble alkylacrylamide into a water-external microemulsion or a micellar surfactant solution.

10 Claims, 5 Drawing Figures

ACRYLAMIDE-ALKYLACRYLAMIDE COPOLYMERS

CROSS-REFERENCE TO RELATED APPLICATIONS

This is a C.I.P. of Ser. Nos. 454,239 and 454,290, filed on Dec. 29, 1982 both now abandoned.

BACKGROUND OF THE INVENTION

Polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well-known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decrease strongly upon increasing concentrations of brine.

We have discovered an alternative means for providing polymers which viscosify water or brine at low concentrations. This method relies on the incorporation of a small amount of hydrophobic groups into a polymer with a water soluble backbone. Those hydrophobic groups tend to associate with one another in an aqueous solution, and when the association occurs intermolecularly, the solution viscosity may be increased relative to the polymer without the hydrophobic side groups. An additional benefit is that the solution viscosity is relatively insensitive to salts because the hydrophobic groups are not ionic.

The synthesis of copolymers composed of water soluble and water insoluble monomers presents difficulties. In order for polymerization to be effected, the monomers must obviously come into close proximity to one another. A variety of processes based upon prior art could conceivably achieve this, but have serious deficiencies, necessitating the processes disclosed in copending applications Ser. No. 526,990, filed 8/29/83 and Ser. No. 527,108, filed 8/29/83. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominently water soluble polymer. This would therefore require the extra step of separating the unreacted monomer particulates from the reaction product.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Further, the water miscible solvents such as alcohols, acetone, ether and acetic acid are fairly good chain transfer agents and when used in reasonable quantities would lead to decreased molecular weights and hence poor viscosification efficiency.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in droplets which are at least one micron in diameter. These droplets must be stabilized against coalescense by a combination of agitation and added surfactant. The product copolymer is usually in the form of particulates with diameters on the order of 500 to 2000 Å.

SUMMARY OF THE INVENTION

Novel water soluble copolymers of acrylamide and an alkylacrylamide have been found to provide efficient viscosification of water or brine. The polymers can be produced by processes which disperse the water insoluble alkyl acrylamide on a sufficiently fine scale. The polymers produced by these processes are substantially free of particulates of insoluble matter. Aqueous solutions of these copolymers are capable of solubilizing water insoluble substances. They have intrinsic viscosities in water greater than about 1 dl/g. Aqueous solutions of the copolymers have viscosities which are relatively insensitive to salt.

DETAILED DESCRIPTION OF THE INVENTION

The water soluble copolymers of the instant invention are characterized by the formula:

wherein $R_1$ is preferably a $C_6$ to $C_{22}$ straight chained or branched alkyl or cycloalkyl group, more preferably $C_6$ to $C_{20}$ and most preferably $C_6$ to $C_{18}$, and $R_2$ is the same or different alkyl group as $R_1$, or hydrogen. Typical, but nonlimiting examples of preferred alkyl groups are hexyl, octyl, decyl, dodecyl and hexadecyl groups; X is preferably about 90.0 to about 99.9 mole %, and more preferably about 95.0 to about 99.8 mole %, and most preferably about 97.0 to about 99.5 mole %. These water soluble copolymers are of a sufficient high molecular weight that they are efficient viscosifiers of water or brine, but not so high that they are readily susceptible to irreversible shear degradation. That is, their intrinsic viscosity is greater than about 1 dl/g and less than about 10 dl/g.

The copolymers may be synthesized by either of two processes. Both of them rely on dispersing the alkylacrylamide on a very fine scale and the product in both cases is substantially free of microgel or particulates of insoluble polymer.

One process relies on cosolubilizing the water insoluble monomer into a predominantly aqueous media by the use of a special mixture of surfactant, cosurfactant, and hydrocarbon. When mixed with an aqueous solution of the water soluble monomer, these special mixtures can disperse on a molecular scale the water insoluble monomer to form isotropic, clear, homogeneous systems, called microemulsions. These microemulsion reaction mixtures are free of visible oil droplets or particulates of the water insoluble monomer. The polymerization can therefore be initiated by water soluble initiators to give, surprisingly, copolymers of the water soluble monomer and water insoluble monomer which are substantially free of visible particulates. The resultant reaction product remains homogeneous. The components of the microemulsion can be chosen so as to give copolymers which are water soluble and which viscosify at low concentrations.

The microemulsion droplets used in this process form spontaneously upon mixing the components together, i.e., they do not require the vigorous mixing conditions that are required for the preparation of macroemulsions such as that used in conventional emulsion polymerization processes. The process is further differentiated from conventional emulsion polymerization processes in that the diameters of the microemulsion droplets are of the order of 100 to 1000 Å in contrast to the diameters of the emulsion droplets of at least 10,000 Å. Thus, the microemulsion reaction mixture is much more stable against demixing than the formulations used in emulsion polymerization. Indeed, no stirring is required during the course of the microemulsion copolymerization—the droplets remain extremely finely dispersed throughout. Moreover, the extremely dispersed nature of the microemulsion droplet containing the water insoluble monomer permits the copolymerization to occur in such a way that a water soluble copolymer is produced which does not contain particulates or latices of water insoluble polymer. This would be detrimental in such applications as secondary oil recovery, which requires a product substantially free of pore plugging particulates.

The microemulsion formulations which may be used in the process are generally complex mixtures of a surfactant, cosurfactant, hydrocarbon or oil and water or brine. The water or brine is generally the predominant component, comprising from about 80 to 90% of the total mixture. The surfactant used may be any of the water soluble surfactants such as salts of alkyl sulfates, sulfonates, carboxylates and the like, or nonionic such as ethylene oxide-propylene oxide copolymers, or polyoxyethylene alkyl ethers, etc., or cationic surfactants such as primary alkylamines, dialkyl secondary amines, or ethoxylated fatty amines. The cosurfactant used in formulating the microemulsion is often an aliphatic alcohol containing about four to about eight carbon atoms, but may also be any of the surfactants chosen above. The oil used is one that is capable of dissolving the water insoluble monomer. The cosurfactant is then chosen by determining whether a microemulsion can be formed by, e.g., titrating with it the other components which are dispersed into water at the desired concentrations. This dispersion is usually a macroemulsion. If the cosurfactant is capable of making this dispersion transparent (indicating droplet sizes less than about 1000 Å) during the titration then it is a candidate microemulsion reaction mixture. Other methods of chosing the cosurfactants and the relative concentrations of components may also be used. Compositions within the range of 1:2 to 2:1 cosurfactant/surfactant (on a weight basis) and with an oil/(surfactant & cosurfactant) ratio of 4:1 to 1:4 are useful but non-limiting guidelines. The composition limits within which the composition is clear (i.e. the microemulsion droplets have diameters less than about 1000 Å) are often narrow.

Some further guidance on the formulation of microemulsions which can be useful may be found in "Microemulsions—Theory and Practice", L. M. Prince, ed., Academic Press, N.Y., N.Y., (1977) p. 33 ff.

An alternative process for dispersing the water insoluble monomer into a predominantly aqueous phase containing the dissolved water soluble monomer makes use of a single surfactant with no oil or cosurfactant. In order to prevent the formation of undesireable particulates of insoluble polymer, the surfactant must be chosen to be one that is capable of solubilizing the water insoluble monomer on an extremely fine scale so that the resulting mixture is isotropic, clear and homogeneous. Thus, the solubilzation of the water insoluble monomer must take place entirely into the micelles that form when the surfactant is dissolved into water. That is, the formation of droplets of the order of 1 $\mu$m in diameter or greater, such as that formed in conventional emulsion polymerizations, is undesirable because they tend to phase separate upon standing, leading to undesirable inhomogeneties in the produced copolymer. The homogeneous micellar reaction mixture is on the other hand, much more stable against demixing than the formulations used in emulsion polymerization processes. Indeed, no stirring is required during the course of the micellar copolymerization—the micellar aggregates remain extremely finely dispersed throughout. Moreover, the extremely disperse nature of the micellar aggregates permits the copolymerization to occur in such a way that a water soluble copolymer is produced which does not contain particulates or latices of water insoluble polymer. These would be deterimental in such applications as secondary oil recovery, which requires a product which is substantially free of pore plugging particles.

The surfactants which may be used in this process may be one of the water soluble surfactants such as salts of alkyl sulfates, sulfonates, carboxylates and the like, or nonionic such as ethylene oxide-propylene oxide copolymers, or polyoxyethylene alkyl ethers, etc., or cationic surfactants such as primary alkylamines, dialkyl secondary amines, or ethoxylated fatty amines. Suitable surfactants may be chosen from these on the basis of water solubility and solubilization capacity for the water insoluble monomer.

Suitable free radical initiators for these processes are peroxides such as hydrogen peroxide, potassium persulfate, alkyl peroxides and the like. The concentration of the free radical initiator is about 0.01 to about 0.50 grams per hundred grams of acrylamide and alkyl acrylamide monomer. The polymerization is conducted in the absence of oxygen at a temperature of about 20 to about 100° C. The polymer may be recovered from the microemulsion reaction mixture by precipitation by nonsolvents such as acetone.

DESCRIPTION OF THE PREFERRED EMBODIMENT

The following examples explain the invention, which are by way of illustration, but not of limitation.

In the examples and comparative examples, the alkyl acrylamides used were prepared as follows. A 500 ml 4 necked round bottom flask was equipped with a condenser, thermometer, $N_2$ inlet, magnetic stir bar and dropping funnel. After purging with $N_2$, the n-octylamine, 14.35 g (0.11 mole) and triethylamine, 12.35 g (0.12 mole) was dissolved in 50 ml of toluene and added to the dropping funnel. The reaction is exothermic so the temperature was controlled via an ice bath and the acryloyl chloride was added dropwise so that the contents of the flask stayed below 40° C. The resulting slurry was stirred for an additional hour and then filtered to remove the triethylamine hydrochloride. The filtrate was stripped in a rotary evaporator to remove toluene. The resulting product was taken up into 240 ml of acetone and then cooled to $-70°$ C. in a dry ice bath. The monomer crystals which resulted were filtered and then vacuum dried at room temperature for one day. A yield of 14.3 g ($\approx 70\%$) of white crystals was obtained. A melting range of 36° to 37° C. was observed. The same procedure was used to prepare N-(dodecylacrylamide except 20.36 g (0.11 mole) of N-dodecylamine was substituted for the n-octyl amine.

EXAMPLE 1

Acrylamide/Dodecyl acrylamide //99/1 Mole Percent in Tween-60 Microemulsion

In this copolymerization, a nonionic surfactant, Tween-60, supplied by ICI Americas, was chosen. Tween-60 is a polyoxyethylene-20-sorbitan monostearate having the formula:

wherein $u+v+y+Z=20$.

A microemulsion concentrate was prepared by mixing 15.85 g of the Tween-60 surfactant, 8.15 g of the cosurfactant, n-pentanol and 1.0 g of hexadecane. A clear homogeneous mixture resulted. Then 0.5 g of dodecyl acrylamide was dissolved in this mixture.

This was placed in the reactor and then 460 ml of deaerated water was added under $N_2$ and 14.69 g of acrylamide was added. After mixing, the microemulsion reaction mixture was water-clear and had a low viscosity. The claraity was comparable to the Tween-60 microemulsion itself without added comonomers. The initiator, consisting of potassium persulfate (0.01 g), was added when the temperature reached 50° C. The temperature was maintained for 24 hours. The resulting mixture became slightly hazy and slightly foamy, but no phase separation of the components occurred. The polymer was recovered by precipitation into acetone and it was redissolved into water.

COMPARATIVE EXAMPLE 1

Preparation of Acrylamide/Dodecyl Acrylamide//99/1 Mole % in Water

In this polymerization, 460 g of deaerated water was placed into a nitrogen purged polymerization reaction vessel and 14.69 g of acrylamide and 0.5 g of solid dodecyl acrylamide were added. Nitrogen was continuously bubbled through the mixture, and it was heated to 50° C. The dodecyl acrylamide became somewhat better dispersed at this temperature. When the temperature reached 50° C., 0.01 g of potassium persulfate was added as initiator and the reaction was left at this temperature for 24 hours. A very viscous mixture resulted but there were small particles dispersed throughout, giving it a very cloudy appearance. The polymer was recovered by precipitation into acetone, dried, and redissovled into water at a concentration of 0.5 wt.%.

Relative amounts of particulates in this solution and one prepared from Example One were assessed by determining the volumes of solution that could pass through a Nuclepore TM polycarbonate filter which was 13 mm in diameter and had a pore size of 5 $\mu$m. The copolymer polymerized in water plugged the filter after only 6 $cm^3$ of solution passed through it. In contrast, 28 $cm^3$ of solution of the microemulsion polymerized copolymer of Example One was able to pass before plugging. Thus, the microemulsion copolymerization technique provides a product that produces a polymer solution more free of particulates.

One method of ascertaining the incorporation of hydrophobic groups in a water soluble polymer structure involves solubilization of a hydrophobic material which is normally insoluble in the aqueous phase. The solubilization properties of the two copolymers of Example 1 and Comparative Example 1 were compared by measuring the saturation uptake of an oil soluble dye into a 0.5 wt. % solution of the copolymer. The absorption in a one cm cell at 485 nm was $0.424 \pm 0.007$ for the microemulsion polymerized copolymer and $0.0795 \pm$ for the copolymer made in the absence of microemulsion. This latter value is indistinguishable from the absorption of water saturated with dye. This is evidence that the water polymerized product did not incorporate the hydrophobic dodecyl acrylamide, while the microemulsion polymerized products of Example 1 did incorporate dodecyl acrylamide.

EXAMPLE 2

Acrylamide/Dodecyl Acrylamide//98/2 in Tween-60 Microemulsion

This polymerization was carried out in the same manner as Example 1, except that 1.0 g (2 mole %) of dodecyl acrylamide was used to make a somewhat more hydrophobic polymer. The reaction product was similar in appearance to Example 1 and had a similar low microgel content. The reaction product did not phase separate and was macroscopically homogeneous. However, when the polymer was separated from the surfactant by repeated acetone precipitation, the product was not completely soluble in water. Approximately 40% of a 1% solution in water contained in a test-tube formed a swollen, turbid gel in the bottom of the tube. A sample of the same polymer added to the Tween-60 microemulsion at the same concentration, however, formed a single uniform, slightly turbid phase.

EXAMPLE 3

Acrylamide/Dodecyl Acrylamide Copolymers

Copolymers of acrylamide and dodecyl acrylamide were prepared, according to the procedure of Example 1, with different mole fractions of dodecyl acrylamide that were initially contained in the polymerization vessel. These copolymers were isolated, purified and redissolved in water to give solutions with known concentrations.

Figure 1:
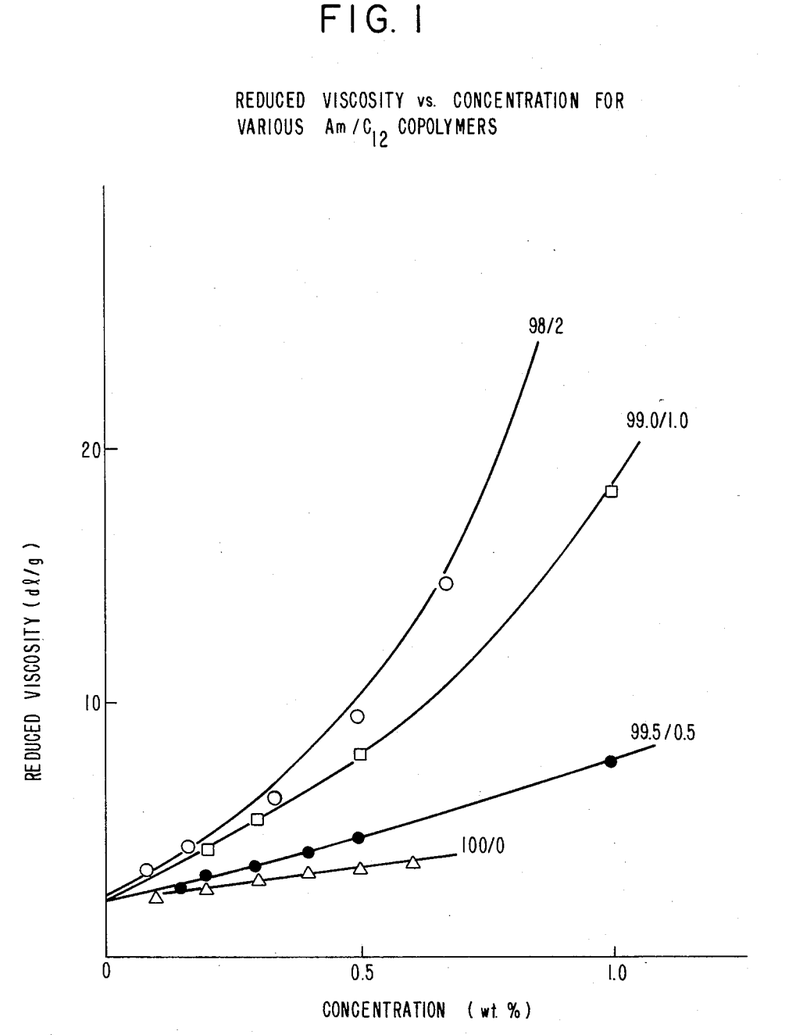
FIG. 1 illustrates a plot of reduced viscosity versus concentration for acrylamide/dodecyl acrylamide copolymers polymerized in a Tween-60 microemulsion.

The viscosities of these solutions were measured by means of a Contraves TM low shear viscometer model LS30 using a No. 1 cup and No. 1 bob. Temperatures were controlled to ±0.1° C., and measurements were made at a rotational speed that gave a shear rate of 1.28 s$^{-1}$. The concentration dependence of the solutions are plotted in FIG. 1 for different mole fractions of dodecyl acrylamide as the amount of hydrophobic monomer is increased in the copolymers, the specific viscosity per unit mass of polymer also increases. An important feature demonstrated by these data is that the intercepts at zero concentration are independent of the mole fraction of dodecyl acrylamide. This intercept is the intrinsic viscosity, defined as $$[\eta] = \lim_{c \to 0} \frac{\eta - \eta_o}{\eta_o C}$$

where $\eta_o$ is the viscosity of the solvent, and $\eta$ is the measured viscosity of the solution with a concentration of polymer c. This intrinsic viscosity is related to the molecular parameters for a homopolymer by $$[\eta] = 2.5 N_A \frac{v_h}{M_w},$$

where $N_A$ is the Avagadro number, $M_w$ is the polymer molecular weight and $v_h$ is the hydrodynamic volume. For copolymers with a repeating backbone unit, the hydrodynamic volume is given by:

$$v_h = \frac{4\pi}{3} \xi^3 R_G^3$$

where $R_G$ is the radius of gyration of the polymer, and $\xi$ is a dimensionless constant with a theoretical value of 0.875 for poolymer having a random chain conformation.

The radius of gyration is given by $$R_G = \beta_v{0.6}$$

where $\beta$ is an effective gond length and $\nu$ is the degree of polymerization. The molecular weight of a copolymer with a mole fraction 1-y of acrylamide ($M_W=71$) and dodecyl acrylamide ($M_W=239$) is given by $$M_W = [(1-y)71 + 239 y]\nu,$$
or
$$M_W = (71 + 168y)\nu,$$
so $$[\eta] = \frac{10\pi}{3} \cdot N_A \beta^3 \xi^3 \cdot \frac{\nu^{0.8}}{71 + 168}.$$

This formula permits one to compare intrinsic viscosities for acrylamide/dodecyl acrylamide copolymers in a simple way. For example, the copolymer with x=0.98 can be compared with the homopolymer, which has x=1.0:

$$\frac{[\eta] 0.98}{[\eta] 0.98} = \left[\frac{0.98}{1.0}\right]^{0.8} \frac{71 + 168}{71 + 168(0.98)} = 1.01 \left[\frac{\nu_{0.98}}{\nu_{1.0}}\right]^{0.8}$$

Thus, if the degree of polymerization for the two polymers are the same, their intrinsic viscosities should differ by only one percent. Conversely, if the intrinsic viscosities of the two polymers differ by only a few percent, then we may infer that their degrees of polymerization are nearly the same. FIG. 1 therefore shows that the degree of polymerization of the copolymers and homopolymer are very nearly all equal, and that introduction of the dodecyl acrylamide produces a beneficial enhancement in viscosity.

Values for the reduced viscosities of some of these systems are shown in Table I at a polymer concentration of one percent, in water and also in a two percent sodium chloride solution. These data show that the viscosities are not lowered by the salt.

TABLE I

Alkyl Acrylamide-Acrylamide Copolymer Compositions and Reduced Viscosities

| RAM | AM (Mole %) | $\eta_{sp}/C$ (Water) (dl/g)$^{(a)}$ | $\eta_{sp}/C$ (2% Salt) (dl/g)$^{(a)}$ |
|---|---|---|---|
| — | 100 | 5.2 | — |
| $C_{12}$ | 99.5 | 7.8 | 8.4 |
| $C_{12}$ | 99.0 | 18.4 | 16.5 |
| $C_{12}$ | 98.0 | 32.1 | 34.7 |
| $C_{12}$ | 80.0 | —$^{(b)}$ | —$^{(b)}$ |
| $C_8$ | 99.5 | 8.3 | 8.5 |
| $C_8$ | 99 | 18.3 | 19.7 |
| $C_8$ | 98 | 308 | 306 |

$^{(a)}$At 1% polymer concentration
$^{(b)}$Insoluble

EXAMPLE 4

Acrylamide/Dodecyl Acrylamide//99.5/0.5 in Tween-20/SPAN 20 Microemulsion

A copolymer of 99.5 mole % acrylamide and 0.5 mole % dodecylacrylamide was prepared in a manner similar to that described in Example 1 except that SPAN 20 surfactant was used as a cosurfactant. A microemulsion concentrate consisting of 10 parts by weight of Tween-20 surfactant, 1 part by weight of SPAN 20 surfactant and 1.2 parts by weight of hexadecane was prepared by mixing the components at a temperature of about 80° C. and subsequently cooling it to room temperature to give a homogeneous fluid. No alcohol was used. To 25 g of this mixture, 0.25 g of dodecylacrylamide was added, then after dissolution of it, 14.76 g of acrylamide and 475 ml of water were added. This mixture was purged with nitrogen. The temperature was brought to 70° C. to give a clear, stable microemulsion reaction mixture. Then 0.1 g of potassium persulfate initiator was added. The mixture was stirred under nitrogen for 24 hours. The polymer was precipitated with acetone and vacuum dried.

Figure 2:
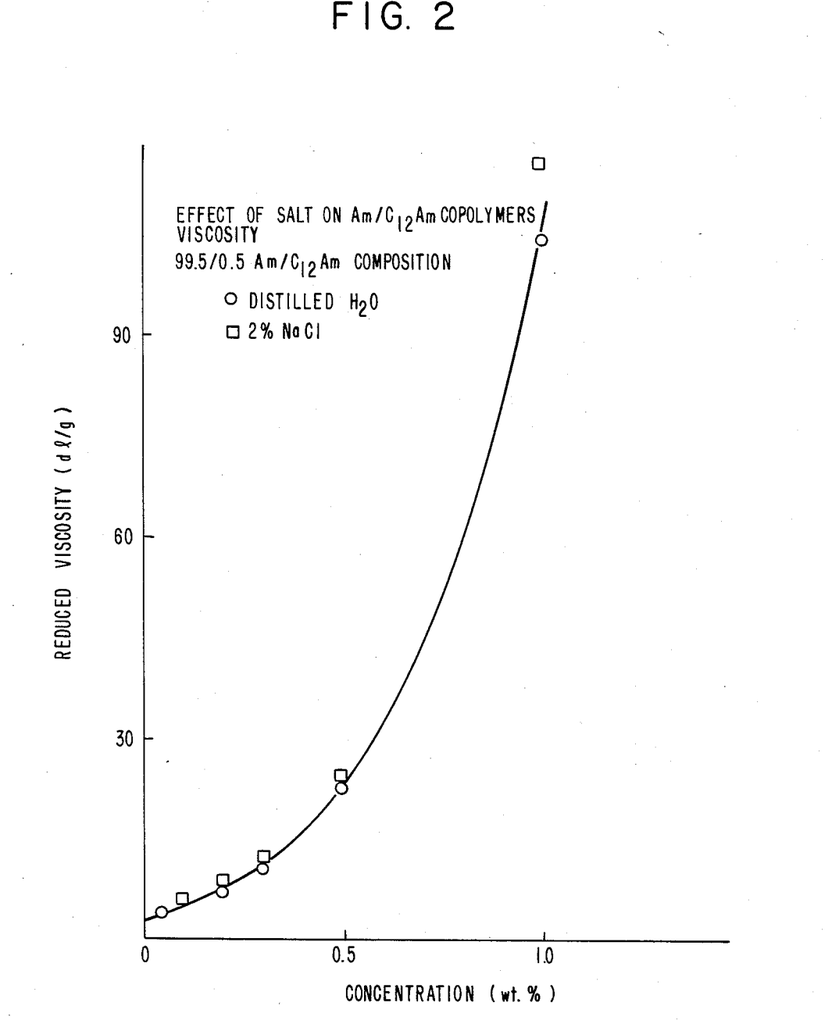
FIG. 2 illustrates a plot of reduced viscosity versus concentration of acrylamide/dodecylacrylamide copolymers (polymerized in a Tween-Span microemulsion) and the effect of salt thereupon.

This polymer was dissolved in water and viscosities as a function of concentration were measured as previously described. Similar concentrations of polymers were prepared in a two weight percent sodium chloride solution and the viscosities were also measured. The results are compared in FIG. 2, which shows that the viscosities are substantially unchanged by the presence of sodium chloride. This contrasts sharply with the well-known acrylamide/sodium acrylate copolymers.

EXAMPLE 5

Acrylamide/Octyl Acrylamide Copolymers

Figure 3:
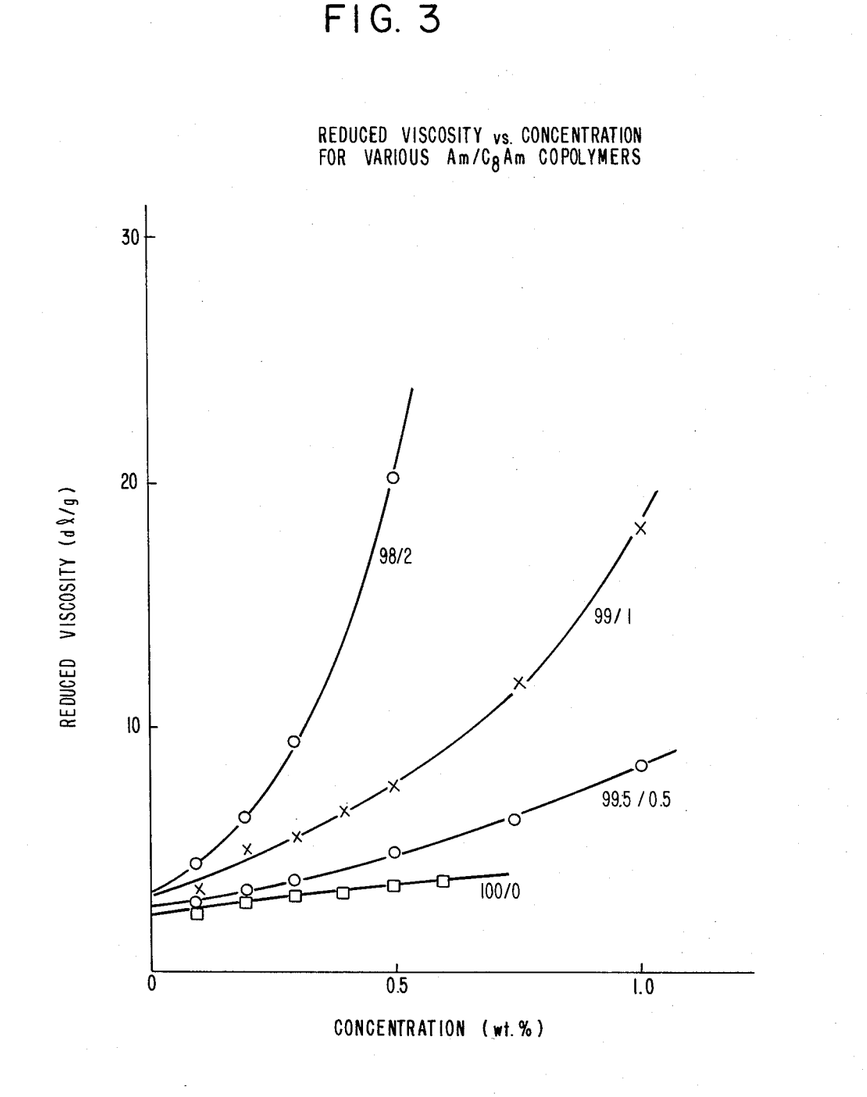
FIG. 3 illustrates a plot of reduced viscosity versus concentration for acrylamide/octyl acrylamide.
Figure 4:
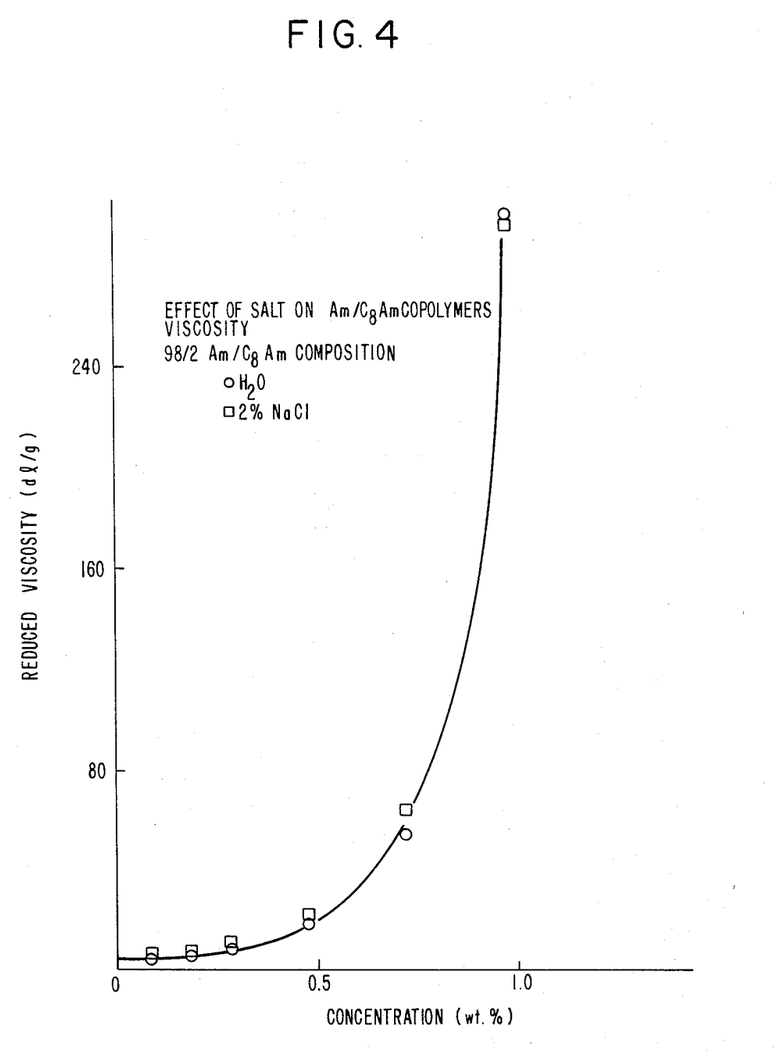
FIG. 4 illustrates a plot of reduced viscosity versus concentration of acrylamide/octyl acrylamide copolymers and the effect of salt thereupon.

Copolymers of acrylamide/octyl acrylamide were prepared according to the procedure of Example 1. FIG. 3 gives results for their reduced viscosity as a function of concentration in aqueous solutions for the formed copolymers. These plots clearly demonstrate the improved thickening efficiency resulting from the introduction of a small mole fraction of octyl acrylamide into the polymer. The salt independence of the viscosity is also shown in Table I. Plots with and without 2% NaCl are also compared in FIG. 4 for the 98/2 acryamide/octyl acrylamide copolymer.

EXAMPLE 6

Micellar Copolymerization of 99.25/0.75 Mole % Acrylamide/Octyl acrylamide

A one liter flask was equipped with an electric stirrer, reflux condenser, thermometer and inert gas inlet and outlet. The flask was flushed with nitrogen for one half hour. Then 15.85 g of sodium dodecyl sulfate (Polysciences), 14.76 g of acrylamide (twice recrystallized) and 0.288 g of octyl acrylamide and the 470.7 g of water that was deaerated with bubbling $N_2$ was added to the reaction flask. After a few minutes, a homogeneous, water-clear mixture resulted. It was then heated to 50° C. and 0.01 g of potassium persulfate initiator was added. After 24 hours of stirring at this temperature, the mixture became very viscous, but it remained homogeneous and transparent. It was then cooled to room temperature, removed from the reaction vessel and precipitated by the addition of acetone. The polymer was then vacuum dried at room temperature for four days. The result was 9.2 g of a pure white friable solid.

EXAMPLE 7

Micellar Copolymerization with Varying Ratio of Acrylamide to Octyl Acrylamide

Polymerization according to the procedures of Example 1 were used except that different amounts of octylacrylamide were added to the reaction vessel. One vessel had no octylacrylamide added, while the other two had sufficient amounts to yield 0.25 and 0.50 mole percent of octylacrylamide, based upon the acrylamide and octylacrylamide. The isolation of the copolymer was also the same.

SOLUTION PROPERTIES

The polymers (0.3 g) prepared as in Example 6 and Example 7 were dissolved into 100 ml of 2% NaCl solution overnight with rather vigorous agitation. These solutions were used as stocks to be diluted with 2% NaCl and viscosities at a shear rate of 1.28 s$^{-1}$ at 25° C. were measured by means of a Contraves LS-30 viscometer. The intrinsic viscosities of the polymers, $[\eta]$ and their Higgins' coefficient, $k_h$, were determined by measuring the viscosities, of five solutions of varying concentration such that the viscosities fell between 1.2 and 2.0 CP. A linear model was used to fit the data, according to the equation $$\frac{\eta - \eta_o}{\eta_o C} = [\eta] + k_h [\eta]^2 C \quad (1)$$

where C is the concentration of polymer in g/100 ml, and $\eta$ is the viscosity of the solvent. The turn on the left hand side of Example 1 is a measure of viscosification efficiency at low concentrations, so high values of $k_h$ and [n] are desirable insofar as high viscosification efficiency is required. A comparison of these parameters as a function of the amount of octylacrylamide used in the micellar copolymerization may be made in Table I.

TABLE 1

| Intrinsic Viscosities and Huggins' Parameters for Am/C$_8$ AM Copolymers | | |
|---|---|---|
| % C$_8$AM | $[\eta]$ | $k_h$ |
| 0.00 | 3.3 ± 0.3 dl/g | 0.7 ± 0.1 |
| 0.25 | 4.2 ± 0.3 | 2.4 ± 0.2 |
| 0.50 | 4.0 ± 0.2 | 1.5 ± 0.1 |
| 0.75 | 6.6 ± 1.2 | 2.1 ± 0.5 |

This table shows that a higher value of Higgins' constent results when the octylacrylamide is included in the copolymerization. The homopolyacrylamide, polymerized under the same conditions not only has a low, expected value of the Higgins' constant, but also has a slightly lower intrinsic viscosity. Thus, improved viscosification efficiency results when the homogeneous micellar copolymerization process is used in combination with a water insoluble monomer.

Figure 5:
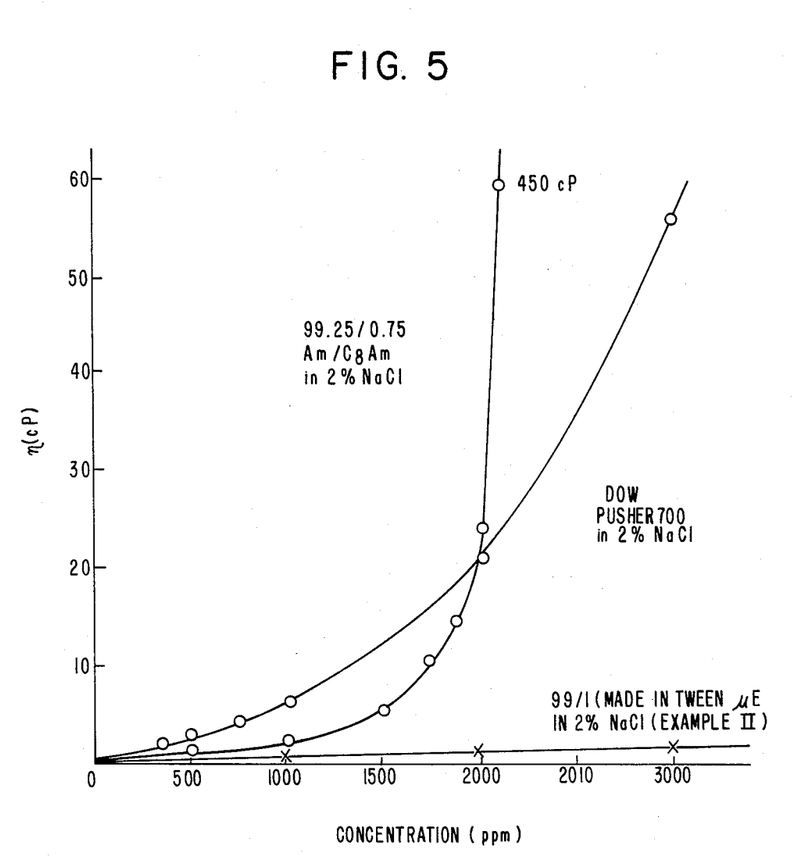
FIG. 5 is a plot of viscosity versus concentration for an acrylamide/octylacrylamide copolymer prepared by a homogeneous micellar polymerization process and a commercially available, partially hydrolyzed polyacrylamide, Dow Pusher ™ 700.

A comparison of the viscosities over a wider range of concentration in two percent sodium chloride solution for the polymers of Example 1 and Example 6 is shown in FIG. 5. Also shown for reference is a commercially available polymer used for aqueous solution viscosification at low concentrations, Dow Pusher ™ 700, which is a partially hydrolyzed polyacrylamide. Above about 2000 ppm the copolymer of Example 6 is much higher than of the commercially available material, even though the last had a measured intrinsic viscosity about five times as high as the former. The high value of the Higgins' constant is responsible for the strong upsweep in viscosity at higher concentrations in the copolymer and shows that the micellar copolymerization process can result in good aqueous solution voscosifiers.

What is claimed is:

1. A copolymer having the formula:

wherein R$_1$ having about 6 to 22 carbon atoms, is an alkyl group, straight chained or branched or cycloalkyl group, R$_2$ is the same or different alkyl group as R$_1$ or hydrogen, x is about 90.0 to about 99.9 mole %, and y is about 10 to about 0.1 mole %, wherein the intrinsic viscosity of said copolymer is about 1 to about 10 dl/g.

2. A copolymer according to claim 1 wherein R is an alkyl group having about 6 to about 18 carbon atoms.

3. A copolymer according to claim 1, wherein x is about 90.0 to about 99.9 mole %, and y is about 0.1 to about 10.0 mole %.

4. A copolymer according to claim 1, wherein the copolymer is of acrylamide/dodecylacrylamide.

5. A copolymer according to claim 1, wherein the copolymer is of acrylamide/octylacrylamide.

6. A copolymer according to claim 1, wherein the copolymer is of acrylamide/hexylacrylamide.

7. A copolymer according to claim 1, wherein the copolymer is of acrylamide/decylacrylamide.

8. A copolymer according to claim 1, wherein the copolymer is of acrylamide/N,N-dioctyl acrylamide.

9. A copolymer as in any one of claims 1-3, wherein said copolymer is dissovled in water at a concentration level of about 0.03 to about 0.5 grams of copolymer per 100 grams of water.

10. A copolymer as in any one of claims 1-3, wherein said copolymer is dissolved in salt water at a concentration level of about 0.03 to about 0.5 grams of copolymer per 100 grams of water, said salt water having about 0.5 to about 10.0 wt.% of dissolved solid salts.

* * * * *